3,278,267
AZODICARBONITRILE AND SYNTHESIS THEREOF
Frank Dennis Marsh, Wilmington, Del., assignor to E. I. du Pont de Nemours and Company, Wilmington, Del., a corporation of Delaware
No Drawing. Filed May 8, 1963, Ser. No. 279,022
4 Claims. (Cl. 23—204)

This invention relates to, and has as its principal objects provision of, azodicarbonitrile and a synthesis of the same.

This application is a continuation-in-part of my copending application Ser. No. 215,800, filed August 9, 1962.

*Warning.*—Cyanogen azide, a chemical employed in the immediate invention, is explosive when free or nearly free of solvent and should then be handled with great care. It can be used, however, with comparative safety in dilute or moderately concentrated solution.

The known aliphatic azo compounds comprise a relatively small group of substances some of which have found utility as thermal polymerization initiators for vinyl monomers. Azodicarbonitrile, which has the formula

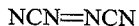

is a previously unknown aliphatic azo compound once mentioned as an objective in unsuccessful attempts to dehydrate formoximeazocarbonamide,

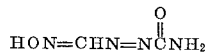

(Wieland and Hess, Ber. 42, 4183 (1909)).

Azodicarbonitrile has now been prepared by controlled thermal decomposition of cyanogen azide in a process illustrated by the following equation:

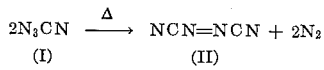

Here the starting material, cyanogen azide, is represented by Formula I and the product, azodicarbonitrile, by Formula II. Temperatures used for the process are generally in the range of about 25–400° C. and the pressures, atmospheric. Lower or higher pressures can, however, be used. Batch or continuous flow procedures are usable with the cyanogen azide with the cyanogen azide starting material in liquid, gaseous or mixed gas-liquid form.

Liquid-phase reaction can be very conveniently conducted in a solvent medium, and this variation is especially convenient since cyanogen azide is preferably produced and handled in such a medium (cf. copending application Ser. No. 215,800). A wide variety of solvent media can be employed including: halohydrocarbons such as methylene chloride, ethyl bromide, methyl iodide, ethylene dichloride, 1,1,2,-trichloro-1,2,2-trifluoroethane, 1,2-dichlorohexafluorocyclobutane, and bis-(trifluoromethyl) perfluorocyclobutane; hydrocarbon or halohydrocarbon esters such as methyl isobutyrate, amyl acetate, ethyl chloroacetate, and 2-chloroethyl propionate; polyfluoroperhaloalkyl ketones such as hexafluoroacetone and s-difluorotetrachloroacetone; N,N-dialkyl amides such as dimethylformamide and diethylacetamide; perfluoroalkyl nitriles such as trifluoroacetonitrile and heptafluorobutyronitrile; and the like.

Vapor phase pyrolysis is preferred for large scale preparation of the azodinitrile, e.g., by use of cyanogen azide mixed with cyanogen chloride, the volatile chloride serving as an inert gaseous diluent. Other inert diluents such as nitrogen, helium, argon, carbon dioxide, tetrafluoromethane or sulfur dioxide can be substituted for cyanogen chloride. Cyanogen azide can also be dissolved in a high-boiling solvent such as dimethyl phthalate and vaporized readily therefrom under reduced pressures.

The time of reaction for efficient production of azodicarbonitrile from cyanogen azide depends generally upon the temperature at which the decomposition is carried out, the time being prolonged to hours or days in batch-type operation at temperatures in the lower portion of the effective range, i.e., at temperatures in the range 25–75° C., or shortened to as little as fractions of minutes in flow-type operation at temperatures in the higher portion of the effective range, i.e., at temperatures in the range 75–400° C.

Azodicarbonitrile is relatively volatile and can be separated from other components of the reaction mixture by fractional distillation or if it is prepared in the presence of an appropriate solvent medium it can be crystallized therefrom by cooling and isolated by filtration. Since it tends to codistill with many of the preferred solvents, e.g., s-dichlorotetrafluoroacetone, gas chromatography has been found especially convenient as a means of separating it efficiently and cleanly from the various solvents. Gas chromatographic separation also affords a ready method of routine identification (by its predetermined characteristic retention time) and assay of azodicarbonitrile in reaction mixtures.

Azodicarbonitrile is an orange-red crystalline solid melting in the range 35–37° C. which can be volatilized without decomposition at atmospheric or superatmospheric pressure and temperatures up to 400° C. It has the molecular formula $C_2N_4$ and the structural Formula II, shown above. Its infrared absorption spectrum shows strong absorption characteristic of the cyano group at $4.51\mu$ (ca. 2220 cm.$^{-1}$) and it displays maximum absorption in the far ultraviolet at 432 m$\mu$.

Inasmuch as azodicarbonitrile has a N=N double bond, it can exist in stereoisomeric cis and trans forms (cf. Sidgwick, "Organic Chemistry of Nitrogen," Oxford University Press, 1945, pp. 437 and 456). It is intended that both forms be included within the scope of Formula II. However, since the cis and trans forms have not been isolated, their individual properties have not been determined and no assignment is made of stereoisomeric structure to the azodicarbonitrile herein described.

Azodicarbonitrile, by virtue of its deep-red color and its Diels-Alder reactivity with 1,3-dienes, is useful as a diagnostic agent to detect the presence of such dienes in mixtures. The test is conducted by mixing a test solution of azodicarbonitrile with a sample of the mixture to be analyzed. The presence of a 1,3-diene in the test mixture is shown by the disappearance of color. Isolation of solid products from the test mixture extends the test to a means of identification of the particular 1,3-dienes that are detected.

The invention is illustrated in greater detail in the following examples.

EXAMPLE 1

**A. *Preparation of azodicarbonitrile in the liquid phase***

A solution estimated to contain 17 g. (0.25 g. mole) of cyanogen azide dissolved in about 50 g. of ethyl acetate (i. e., from the reaction of 0.25 g. mole of sodium azide and excess cyanogen chloride in 51 g. of ethyl acetate according to the process of application Ser. No. 215,800) was diluted with 80 ml. of s-dichlorotetrafluoroacetone, and the mixture was heated with stirring for 16 hours at a reaction temperature of 50–57° C. During this period, ca. 0.22 mole of molecular nitrogen was liberated. Volatile material from the reaction mixture, separated on a rotary evaporator at temperatures up to a maximum of 70° C. and a pressure of 0.2 mm., was collected in the form of a red liquid condensate. Fractional distillation of the red condensate resulted in separation of s-dichlorotetrafluoroacetone as a colored distillate (evidently containing an unknown amount of codistilled product) and an ethyl acetate solution of product as a deep red residue in the still pot. The residual solution was cooled to −80° C. and orange-red needle-like crystals which formed were separted by filtration of the cold mixture. The product was found to melt at 35.5–37.1° C. and was identified as azodicarbonitrile on the basis of the following analytical data.

Anal. for $C_2N_4$—N, Calc'd: 70.0. Found: 69.5, 70.2, 69.5. Mol. wt.: 80.05, 80.0 (mass spectrometry).

Mass spectrometric pattern:

| m/e | Postulated Ion | Percent Abundance |
|---|---|---|
| 54 | N—N—$CN^+$ | 100.0 |
| 12 | $C^+$ | 37.9 |
| 26 | $CN^+$ | 28.7 |
| 80 | NCN=$NCN^+$ | 24.4 |
| 14 | $N^+$ | 8.8 |
| 28 | $N_2^+$ | 8.6 |
| 40 | N—$CN^+$ | 6.5 |
| 52 | $C_2N_2$, or impurity | 2.0 |
| 27 | $54^{++}$, or HCN impurity | 1.8 |
| 24 | $C_2^+$ | 1.2 |

Infrared absorption: Single absorption at 4.51μ (ca. 2220 cm.$^{-1}$), in the area characteristic of the CN group.

Ultraviolet absorption: $\lambda_{max.}$ at 432 mμ.

B. Gas chromatographic purification of azodicarbonitrile

Purification of azodicarbonitrile in samples of about 0.5 ml. volume was accomplished with a gas chromatographic column, ¾" in diameter and 3 ft. long, packed with 60–80 mesh diatomaceous earth containing 25% by weight of a silicone oil (DC–200, made by Dow Corning Co.). The samples were injected into helium carrier gas flowing at 860 ml. per minute, the injection port being located in a preheater section maintained at 53° C. The packed column was held at room temperature (ca. 25° C.), and the retention time for azodicarbonitrile was about 12 minutes.

C. Reaction of azodicarbonitrile with 2,3-dimethyl-1,3-butadiene.

The identification of azodicarbonitrile was confirmed by the preparation of a derivative by its reaction with 2,3-dimethyl-1,3-butadiene, i.e., by a Diels-Alder reaction characteristic of known azoformic acid derivatives such as diethyl azoformate.

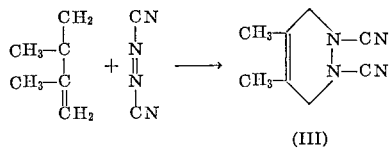

(III)

Freshly distilled 2,3-dimethyl-1,3-butadiene (10 ml.) was added slowly to 10 ml. of a solution of azodicarbonitrile in ethyl acetate, with cooling in an ice bath so as to hold the temperature below 30° C. The color of the azodicarbonitrile disappeared rapidly. The mixture was stored overnight at room temperature and the solvent was removed by evaporation. There was obtained 3.3 g. of light tan crystalline residue which was sublimed at 75–80° C. under 0.1 mm. pressure and then recrystallized from a mixture of petroleum ether and carbon tetrachloride. The colorless purified product, M.P. 78.6–79.4° C., corresponded to the adduct (III) illustrated in the foregoing equation.

Anal. for $C_8H_{10}N_4$—Calc'd: C, 59.2; H, 6.22; N, 34.5. Found: C, 59.0, 59.1; H, 6.26, 6.88; N, 34.5.

The infrared absorption spectrum of this derivative showed absorption peaks characteristic of saturated CH at 3.42μ and 3.49μ, and characteristic of the CN group at 4.49μ. The nuclear magnetic resonance data, in carbon tetrachloride solution with tetramethylsilane as reference, show two unsplit singlets in a ratio of 3:2 at 8.2τ (for $CH_3$) and 6.08τ (for $CH_2$), respectively.

The process of preparing azodicarbonitrile by thermal decomposition of cyanogen azide is further illustrated in the following additional examples in which the general procedure for carrying out the reaction follows that described in Part A of Example 1, the amount of elemental nitrogen liberated being indicative of the extent of the reaction and the presence of azodicarbonitrile in the products being confirmed by gas chromatography. The data for these examples, each which is on a scale of 0.1 mole, is presented in Table I.

TABLE I

| Ex. | Solvent | Temp. (° C.) | Time (hrs.) | Liberated (mole) |
|---|---|---|---|---|
| 2 | Octafluorodithiane | 45–60 | 26 | 0.06 |
| 3 | 1,1,2-trifluoro-1,2,2-trichloroethane | 45–50 | 19 | 0.04 |
| 4 | s-Dichlorotetrafluoroacetone | 35–40 | 44 | 0.09 |
| 5 | Carbon Tetrachloride | 40–45 | 44 | |

EXAMPLE 6

*Preparation of azodicarbonitrile in the vapor phase*

A. *Atmosphere pressure.*—Pure cyanogen azide was eluted at 33° C. from an analytical gas chromatographic column 6' long by ¼" in diameter packed with 40–60 mesh acid-washed firebrick containing 20% by weight of DC–200 silicone oil. Helium was used as carrier gas at a flow of 100 ml. per minute. The azide was passed directly into a pyrolysis tube ("Inconel"; 12" long by ½" in diameter) packed with nickel gauze, and the pyrolyzate was led into a second analytical gas chromatographic column identical with the first. Azodicarbonitrile in the pyrolyzate was determined by its chromatographic retention time and its identity was confirmed by mass spectrometry on an isolated sample of eluent. The following tabulation shows cyanogen azide/azodicarbonitrile ratios, expressed in percentages, in pyrolyzates obtained at various temperatures, the contact time being constant at 0.2 minute.

| Temp., ° C.: | $N_3CN$/NCN=NCN |
|---|---|
| 100 | 100/trace. |
| 125 | 50/50. |
| 150 | 10/90. |
| 186 | Trace/100. |

Stability of the azodicarbonitrile product under pyrolysis conditions was investigated in the above system, and no degradation was observed at temperatures up to 300° C.

In an alternative preparation, nitrogen was bubbled through a 0.57 mole solution of cyanogen azide in dimethyl phthalate at room temperature and the exeunt stream of nitrogen, containing entrained cyanogen azide, was conducted at 200° C. through a glass pyrolysis tube having a free volume of 60 ml. The pyrolyzate gas was passed into a cold (−78° C.) trap, and the material collected in the trap was taken up in 1,1,2-trichloro-1,2,2-trifluoroethane. The proportions of cyanogen azide and azodicarbonitrile in the resultant solution were determined by gas chromatography; the yield of azodicarbonitrile was determined by cooling the solution to −30° C. and isolating by filtration therefrom the orange crystalline product. At a nitrogen flow rate of 600 ml. per minute, the pyrolyzate contained no cyanogen azide and the yield of isolated azodicarbonitrile was 60%. At a flow rate of 740 ml. per minute, the product contained some unchanged cyanogen azide and the yield of isolated azodinitrile was 11%.

B. *Reduced pressure.*—Cyanogen azide dissolved in dimethyl phthalate was introduced dropwise into an evacuated reservoir at room temperature, vaporized azide was pulled by the evacuating pump into a platinum pyrolysis tube held at 200° C., and exit gases were condensed in a cold trap at −78° C. The total pyrolyzate was dissolved in 1,1,2-trichloro-1,2,2-trifluoroethane, 75 ml. of the solvent per mole of original cyanogen azide being used, and the solution was assayed by gas chromatography. Azodicarbonitrile produce was isolated by cooling the solution to −30° C. and filtering the resultant orange crystals. Table II presents data at various pressures.

TABLE II

| Pressure | Azodicarbonitrile/ Cyanogen Azide | Yield of Isolated Azodicarbonitrile |
|---|---|---|
| 4 mm | About 50/50 | |
| 8 mm | Large/small | |
| 12 mm | 100/0 | 24% |
| 14 mm | 100/0 | |

The yield of isolated azodicarbonitrile was increased to 85% at 12 mm. by using a glass tube packed with quartz rings as the evaporator at room temperature and another such tube as the pyrolyzer at 200° C. The pyrolyzate in this instance also contained no unchanged cyanogen azide.

EXAMPLE 7

*Combined preparation of cyanogen azide azodicarbonitrile*

A mixture of 16.25 g. (0.25 g. mole) of sodium azide, 40 ml. of cyanogen chloride, and 75 ml. of 1,1,2-trichloro-1,2,2-trifluoroethane was stirred for 16 hours at room temperature. The mixture was heated in the reactor under a fractionating column and distilled fractions of excess cyanogen chloride and a mixture of azodicarbonitrile and 1,1,2-trichloro-1,2,2-trifluoroethane were collected. During the removal of the second fraction, additional 1,1,2-trichloro-1,2,2-trifluoroethane was added gradually to the reactor. A total of 200 ml. of distilled mixture, obtained in this manner, was cooled to −30° C. and 1.2 g. of pure orange-colored crystalline azodicarbonitrile was obtained.

Since obvious modifications and equivalents in the invention will be evident to those skilled in the chemical arts, I propose to be bound solely by the appended claims.

The embodiments of the invention in which an exclusive property or privilege is claimed are defined as follows:

1. Azodicarbonitrile having the formula NCN=NCN, stability up to about 400° C. and an orange-red color.
2. The process for synthesizing azodicarbonitrile which comprises thermally decomposing cyanogen azide in admixture with an inert diluent and at a temperature in the range 25–400° C. and subsequently recovering azodicarbonitrile from the reaction mixture.
3. The process of claim 2 accomplished in the liquid phase.
4. The process of claim 2 accomplished in the gas phase.

References Cited by the Examiner

Darzens: Compt. rend., vol. 154 (1912), p. 1232.
Hart, C. V.: Jour. Am. Chem. Soc., vol. 50 (1928), pp. 1922–1927.
Russian Chemical Reviews, vol. 32, No. 3, March 1963, pp. 163–165.
Wieland et al.: Ber. Deut. Chem., vol. 42, p. 4183 (1909).

CHARLES B. PARKER, *Primary Examiner.*

IRVING MARCUS, NORMA S. MILESTONE, FLOYD D. HIGEL, *Assistant Examiners.*